(12) United States Patent
Zhang et al.

(10) Patent No.: US 7,536,640 B2
(45) Date of Patent: May 19, 2009

(54) ADVANCED TRANSLATION CONTEXT VIA WEB PAGES EMBEDDED WITH RESOURCE INFORMATION

(75) Inventors: Andy Zhang, Foster City, CA (US); Chen Ouyang, BeiJing (CN)

(73) Assignee: Oracle International Corporation, Redwood Shores, CA (US)

( * ) Notice: Subject to any disclaimer, the term of this patent is extended or adjusted under 35 U.S.C. 154(b) by 281 days.

(21) Appl. No.: 11/045,924

(22) Filed: Jan. 28, 2005

(65) Prior Publication Data
US 2006/0174196 A1 Aug. 3, 2006

(51) Int. Cl.
G06F 15/00 (2006.01)

(52) U.S. Cl. .................. 715/234; 715/264; 715/703; 715/760

(58) Field of Classification Search .......... 715/501.1, 715/513, 535, 536, 542, 703, 205–208, 234, 715/236, 264–265, 760; 704/2–5, 8
See application file for complete search history.

(56) References Cited

U.S. PATENT DOCUMENTS

| | | | | |
|---|---|---|---|---|
| 5,944,790 | A * | 8/1999 | Levy | 709/218 |
| 6,275,790 | B1 | 8/2001 | Yamamoto et al. | 704/8 |
| 6,311,151 | B1 | 10/2001 | Yamamoto et al. | 704/8 |
| 6,330,529 | B1 * | 12/2001 | Ito | 704/3 |
| 6,347,316 | B1 * | 2/2002 | Redpath | 707/10 |
| 6,567,973 | B1 | 5/2003 | Yamamoto et al. | 717/136 |
| 6,623,529 | B1 * | 9/2003 | Lakritz | 715/536 |
| 6,735,759 | B1 | 5/2004 | Yamamoto et al. | 717/136 |
| 6,782,529 | B2 | 8/2004 | Kumhyr | 717/111 |
| 6,865,716 | B1 * | 3/2005 | Thurston | 715/536 |
| 2002/0144253 | A1 | 10/2002 | Kumhyr | 717/170 |
| 2003/0078960 | A1 * | 4/2003 | Murren et al. | 709/203 |
| 2003/0135360 | A1 | 7/2003 | Barker et al. | 704/8 |
| 2003/0135657 | A1 | 7/2003 | Barker et al. | 709/310 |
| 2003/0137530 | A1 | 7/2003 | Griffin | 715/705 |
| 2004/0049374 | A1 * | 3/2004 | Breslau et al. | 704/2 |
| 2004/0168132 | A1 * | 8/2004 | Travieso et al. | 715/536 |
| 2004/0237044 | A1 * | 11/2004 | Travieso et al. | 715/530 |

OTHER PUBLICATIONS xmlspy 5 manual, Enterprise Edition, ALTOVA, 2003, pp. 541-560.*
"Improving Initial Translation Quality Correlation of Context", 23rd Internationalization and Unicode Conference, Prague, Czech Republic, Mar. 2003, pp. 1-10.
Dale Green, "Trial: Internationalization", http://java.sun.com/docs/books/tutorial/i18n/index.html, pp. 68 total, 2004.
John O'Conner, "Java Internationalization: Localization with ResourceBundles", Oct. 1998, pp. 1-5.
"Zaval JRC Editor" Version 2.0, User's Guide, dated 2001, 21 pages, available at http://www.zaval.org/products/jrc-editor/index.html.
Dale Green, "Make Resource Bundle Editor", Oct. 31, 2003, 10 pages.

* cited by examiner

Primary Examiner—Cesar B Paula
(74) Attorney, Agent, or Firm—Silicon Valley Patent Group LLP; Omkar Suryadevara

(57) ABSTRACT

A computer automatically changes a web page that would otherwise be normally generated by a first application program (such as a web-conferencing tool for example) in a first language (e.g. English), by adding metadata to one or more translatable text strings in the web page. The changed web page is displayed to a human translator by a second application program (e.g. the browser is equipped with a plug-in) to receive translation(s) of the translatable text string(s) into a second language (e.g. French). The translations are used as replacements for the translatable text strings, to create a translated version of the first application program, in the second language.

27 Claims, 16 Drawing Sheets

```
<HTML>..........
<TD class=OraHeader width="100%">
<!--
[[[contenttitle$$oracle.ldap.das.nls.UtilResource
Bundle]]]-->Welcome to the Oracle Internet
Directory Self Service  Console
</TD>
......</HTML>
```

FIG. 3B
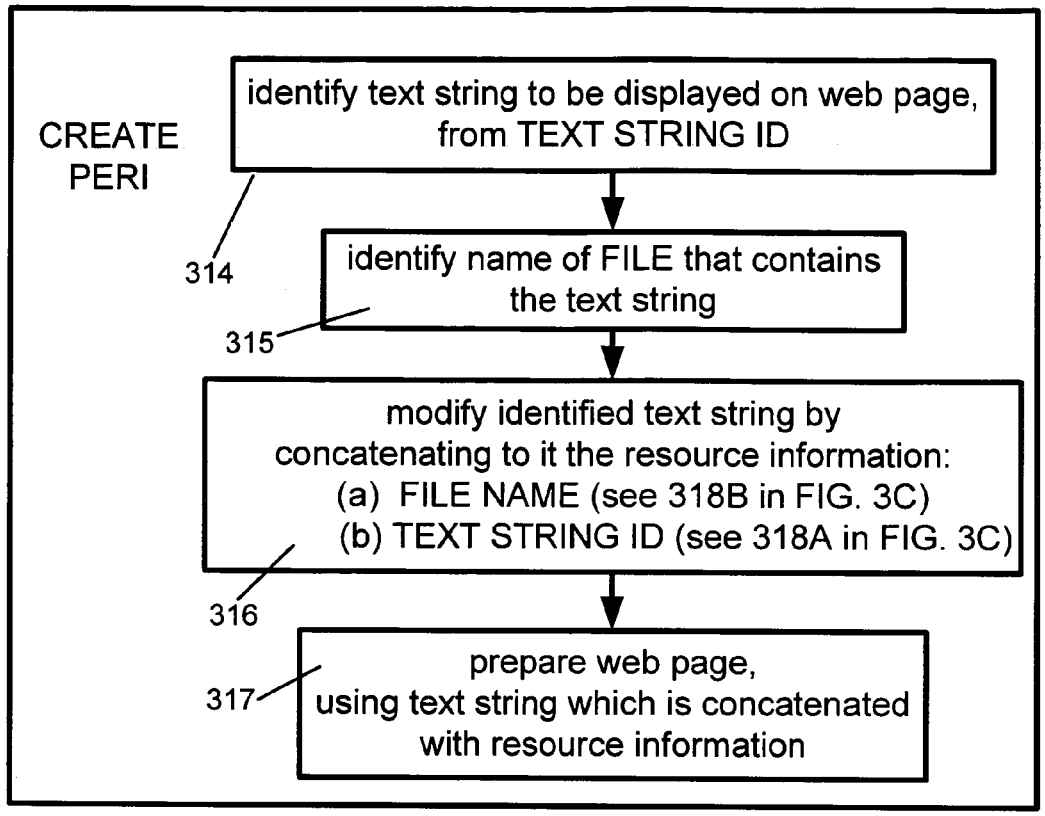
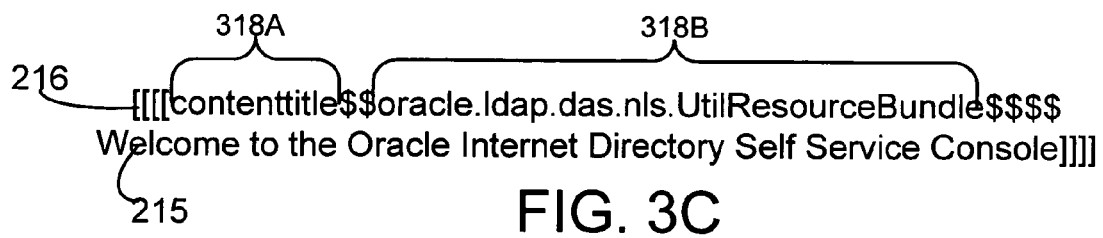
FIG. 3C

FIG. 3D

```
<HTML>.........
  <TD class=OraHeader width="100%">
[[[[contenttitle$$oracle.ldap.das.nls.UtilResource
Bundle$$Welcome to the Oracle Internet
Directory Self Service Console]]]]
  </TD>
......</HTML>
```

FIG. 3E

```
<HTML>.........
  <TD class=OraHeader width="100%">
<!--
[[[[contenttitle$$oracle.ldap.das.nls.UtilResource
Bundle]]]]-->Welcome to the Oracle Internet
Directory Self Service Console
  </TD>
.......</HTML>
```

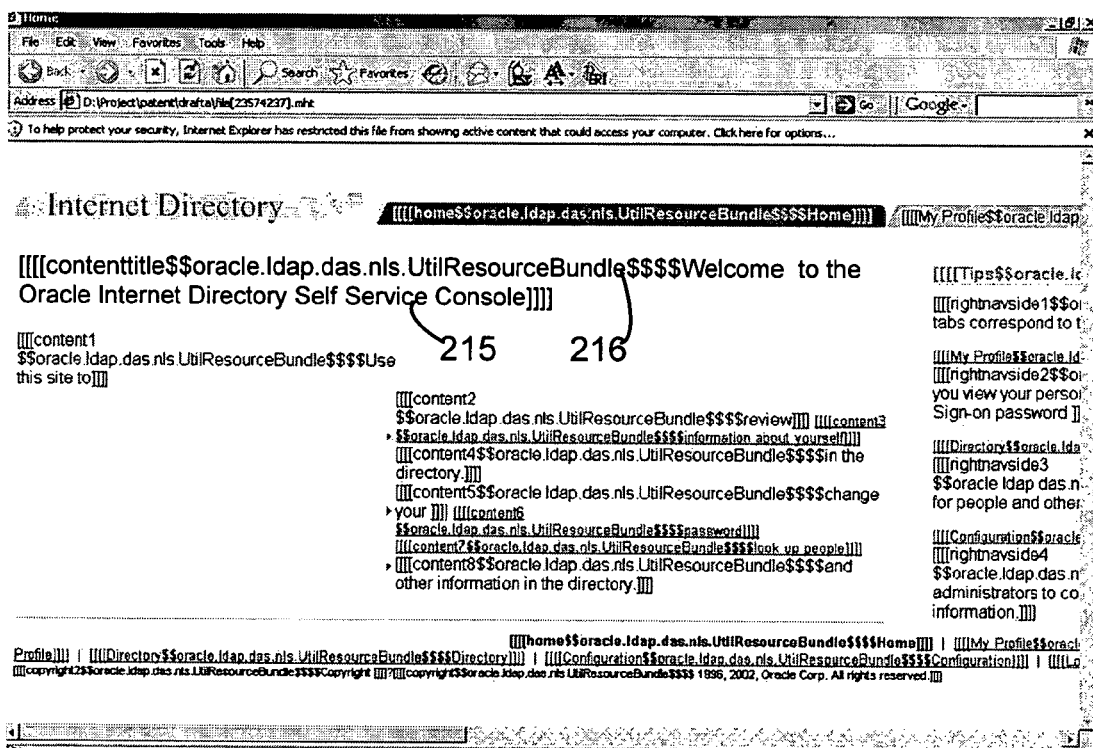
FIG. 3D1

FIG. 3K

| Glossary Search | | | |
|---|---|---|---|
| Entry | Explain | Translation( en ) | |
| zip | 1)A compress file format | Zip | ○ |
| | 2)postalcode | postalcode | ○ |
| OCS | Oracle Collabration Suite | OCS | ○ |
| Login | Logon | login | ○ |
| SSO | Single Single On.User can login once for all component. | SSO | ○ |
| Contact Us | Contact the Admin of the website | Contact Us | ○ |
| Archive | 1)Place for permanent or long-term storage of data.from which retrieval is infrequent. | Archive | ○ |
| | 2)To store data permanently. | Archive | ○ |

[Apply]    [Cancel]

ADVANCED TRANSLATION CONTEXT VIA WEB PAGES EMBEDDED WITH RESOURCE INFORMATION

BACKGROUND

In a process called internationalization, a computer program is designed with text, labels, messages and other locale-sensitive objects separated from source code and kept in a repository of text strings in a first language (e.g. English) that are translatable, for example, a resource bundle in Java, or resource-only dynamic link library (DLL) in Windows. Such separation of the source code from the locale-sensitive information allows the source code to be maintained independent of various language versions of the product. For example, a resource bundle class may be created in Java called "MyResource" to hold all English text that is ever displayed by the computer program. Such separation allows easy customization of the product because all translatable information is identified and isolated into the repository (in a process called "localization"). In the example, to translate a product, one would replace "MyResource" with an equivalent resource bundle containing the translatable text strings in a second language, such as French, e.g. called "MyResource_fr_FR" for France and "MyResource_fr_CA" for Canada. For more information, see an article entitled "Java Internationalization: Localization with ResourceBundles" by John O'Conner published October 1998 which is incorporated by reference herein in its entirety and available at http:%% java.sun.com%developer%technicalArticles%Intl% ResourceBundles%. In this web address and in all other addresses below, a URL is obtained by replacing "%" with "/".

The above-described repository of translatable text strings may be reviewed and edited by use of a software program called "editor tool", such as "Resource Bundle Editor" by David Green published Jul. 6, 2004 available at https:%%resourcebundleeditor.dev.java.net, Copyright MAKE Technologies Inc. A user interface of this editor tool presents three main areas: (1) a first area 1 (FIG. 1A) on the left side, where the keys of the resource bundle are presented and selecting a key causes the appropriate text to show upon the right (2) a second area 2 (FIG. 1A) on the right, in the top half of the user interface, which displays the selected key in the first language (e.g. English) and (3) a third area 3 (FIG. 1A) on the right, in the bottom half of the user interface, which displays the same key but in the second language (e.g. French). Using these three areas in the user interface one or more resource bundles are edited by a human translator. Another such editor tool is the Zaval Java Resource Editor (also called "JRC Editor"), version 2.0 available at the following website http: %%zaval.org%products%jrc-editor%.

One problem with use of the above-described editor tools is that the translatable text strings are displayed to the human translator isolated from their context, and a translation thereof may contain errors which would not be present if the human translator had access to the context in which the translatable text string appears. Hence when using such editor tools, human translators proof-read screens of the translated product, to ensure that the translated text string is properly displayed and properly translates the text in the context of the display. The just-described proof-reading process, called Translation Verification Testing (TVT), is time-consuming and expensive.

TVT is described in detail in U.S. Pat. No. 6,311,151 granted to Yamamoto et al on Oct. 30, 2001 (filed Jul. 28, 1999) and assigned to IBM Corp, entitled "System, program, and method for performing contextual software translations" is incorporated by reference herein in its entirety, as background. FIG. 1B illustrates an example in which a GUI button is stored in a Java ResourceBundle localization file. In FIG. 1B, a window 50 is shown with GUI buttons 51 and 53 created using a Java Jbutton call. In this example, a command "JButton(res.getString ("OK")) 54 creates a GUI button, and labels it by doing a resource file lookup for the text that should correspond to an "OK" button. Java resource files are depicted collectively as 55, and an English language reference file is shown as 56. In file 56, entry 58 indicates that the text that corresponds to an "OK" button is "Ok". Therefore, command 52 creates a GUI button with the text "Ok".

Similarly, the command "JButton(res.getString ("CANCEL")) 54 creates a GUI button, and labels it by doing a resource file lookup for the text that should correspond to an "CANCEL" button. In file 56, entry 57 indicates that the text that corresponds to an "CANCEL" button is "Cancel". Therefore, command 52 creates a GUI button 53 with the text "Cancel". Since resource files store the text to be displayed as Java objects, the introspective properties of the Java environment can be used to allow human translators to directly edit the application text using a pop-up editor. Each text entry in the Java resource files is stored as a Java JComponent, with the resource bundle name and key attached as properties to each JComponent text entry.

According to U.S. Pat. No. 6,311,151, when a translator examines a text object, these properties are introspected along with the JComponent hierarchy, so the translator can edit the correct text entry. When the pop-up editor is activated, a getText call is made to the resource file object, which returns the present text to the editor. This text is displayed to the translator, who then may edit it. After the translation/edit is complete, the new text is stored in the object using a setText call. Finally, the object, with the new text, is stored back into a Java ResourceBundle file. Thereafter, the software application can be executed using the modified objects, which will then show the translated text on the display.

FIG. 1C is described by U.S. Pat. No. 6,311,151 as follows: an application 100 is built, the UI objects, combined with contextual information, is stored in one or more files 110. A copy of these files 120 is sent to the translators. The translators will then execute the contextual translation tool 130, which will use the data in files 120 to build displays similar to those of the original application 100. The translator may then translate the text of the displays in the correct context, to provide a much more accurate and efficient translation process, with respect to prior techniques. The edited text can be stored back into files 120, which can then be read by the original application 100. Files 110 and 120 appear, to the inventors of the current patent application, to be not in any source code form. Instead, files 110 and 120 appear to be in binary, for use by a Java application, which displays a graphical user interface (when executed by a Java virtual machine).

Contextual translations of text strings that are displayed by software programs are also described in one or more of U.S. Pat. Nos. 6,275,790, 6,735,759, 6,567,973, and 6,782,529. Each of the just-described four patents is incorporated by reference herein in its entirety, as background. Such editor tools are also described in one or more of US Patent Applications 20020144253, 20030135360, 20031035657 and 20030137530. Each of the just-described four patent applications is incorporated by reference herein in its entirety, as background.

SUMMARY

When programmed in accordance with the invention, a computer automatically changes a web page that would otherwise be normally generated by an application program (such as a web-conferencing tool for example) in a first language (e.g. English), by adding resource information to one or more translatable text strings in the web page. Depending on the embodiment, the resource information may include, for a given translatable text string, an identifier (called "String ID") that identifies the translatable text string and a name of a source class of the translatable text string. The identifier may be in the form of a number or a text string, depending on the embodiment.

The changed web page is displayed to a human translator by an editor tool (e.g. the browser is equipped with a plug-in) which then receives translation(s) of translatable text string(s) into a second language (e.g. French). The editor tool uses the resource information to support various features that aid a human translator, e.g. (1) list all translatable text string(s) in the web page, (2) highlight all occurrences of a given translatable text string, and (3) automatically translate all occurrences of the given translatable text string, on receiving a corresponding translation from the human translator.

After all translatable text strings are translated, the translations are used to replace the translatable text strings, to create a translated version of the application program, in the second language. Numerous such modifications and adaptations of the embodiments described herein will be apparent to the skilled artisan in view of this disclosure. For example, the application and the editor tool may be executed in a single computer or in two different computers, depending on the embodiment.

BRIEF DESCRIPTION OF THE FIGURES

FIG. 3B illustrates, in a flow chart, acts performed in some embodiments of the invention to create PERI.

FIG. 3C illustrates a modified version (also called "source-descriptive version") of the text string that includes resource information and a text string identified by use of an identifier in the resource information.

FIG. 3D illustrates in HTML code, a PERI that is created by an act 317 of FIG. 3B, including resource information 216 for a text string 215.

FIG. 3D1 illustrates an image generated by display of a badly-formatted PERI page in a browser.

FIG. 3E illustrates, in HTML code, the PERI of FIG. 3D after being filtered in some embodiments by placing, within a comment tag, the resource information 216.

FIGS. 3I, 3J and 3K illustrate screens that are displayed to a human translator, in some embodiments of the invention.

DETAILED DESCRIPTION

When performing an act 201 (FIG. 2A) in accordance with the invention, a computer automatically creates a web page that is embedded with resource information ("PERI"). The embedded resource information identifies the source of one or more translatable text string(s) in the web page. For example, the embedded resource information could be the name of a repository file and an identifier of a string in the repository file that is to be translated. The text string(s) is/are in a base language that may be translated into another language. In an optional act 202, the page embedded with resource information (PERI) is transmitted to another computer (hereinafter "client computer"). In act 203, the page embedded with resource information (PERI) is filtered, to remove from visibility, any resource information in the PERI.

Figure 2A:
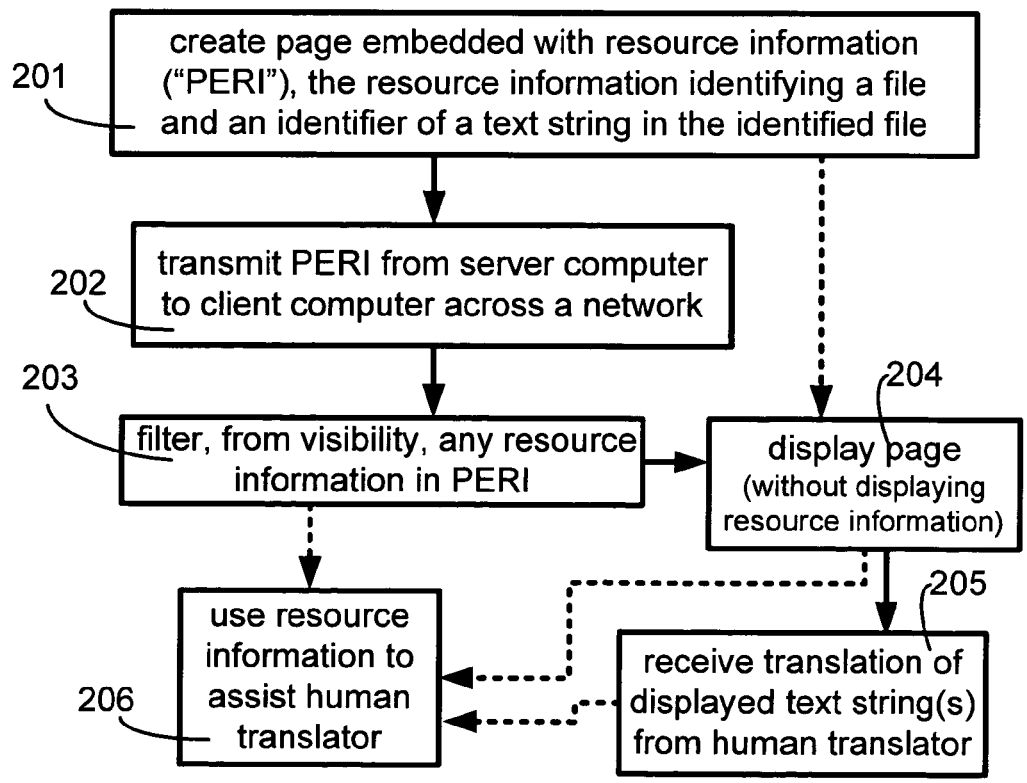
FIG. 2A illustrates, in a flow chart, acts performed by one or more computer(s) programmed in accordance with the invention, to create a web page embedded with resource information ("PERI"), and display the created web page without displaying the resource information.
Figures 2B, 2C:
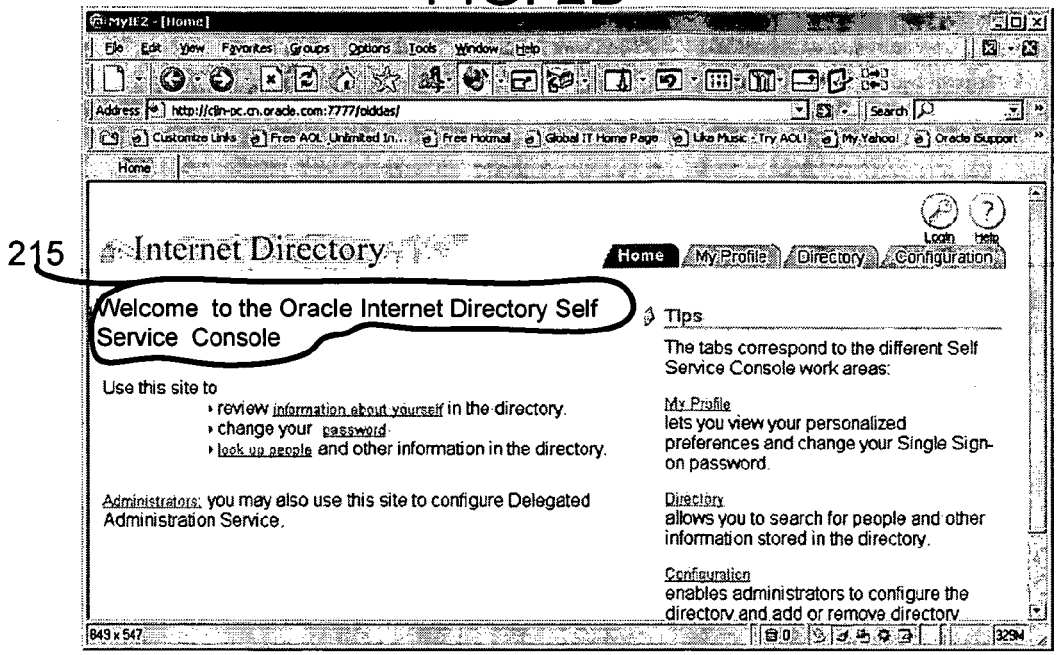
FIG. 2B illustrates, a screen obtained by displaying the web page embedded with resource information (PERI) that is created as per an act illustrated in FIG. 2A.
FIG. 2C illustrates HTML tags in the PERI displayed in the screen of FIG. 2B, showing presence of the resource information in a HTML comment.

In act 204, the PERI is displayed, without displaying the filtered resource information in the web page, as illustrated in FIG. 2B. Specifically, as shown in FIG. 2B, a text string 215 is displayed in the normal manner. The resource information which has been filtered from visibility in the web page is used in act 206 by an editor tool to handle a translation which is received from a human translator in act 205. Note that filtering of act 203 may be implemented in any manner, depending on the embodiment. Some embodiments implement filtering in act 203 by placing the resource information within a tag in PERI, such as a comment tag or the tag <SPAN>. Depending on the embodiment, the resource information may be placed anywhere in PERI (or stored even outside of a web page), as long as the resource information is not displayed by a browser into which a filtered web page (FIG. 2C) is loaded, i.e. to result in the screen shown in FIG. 2B.

Figure 1A:
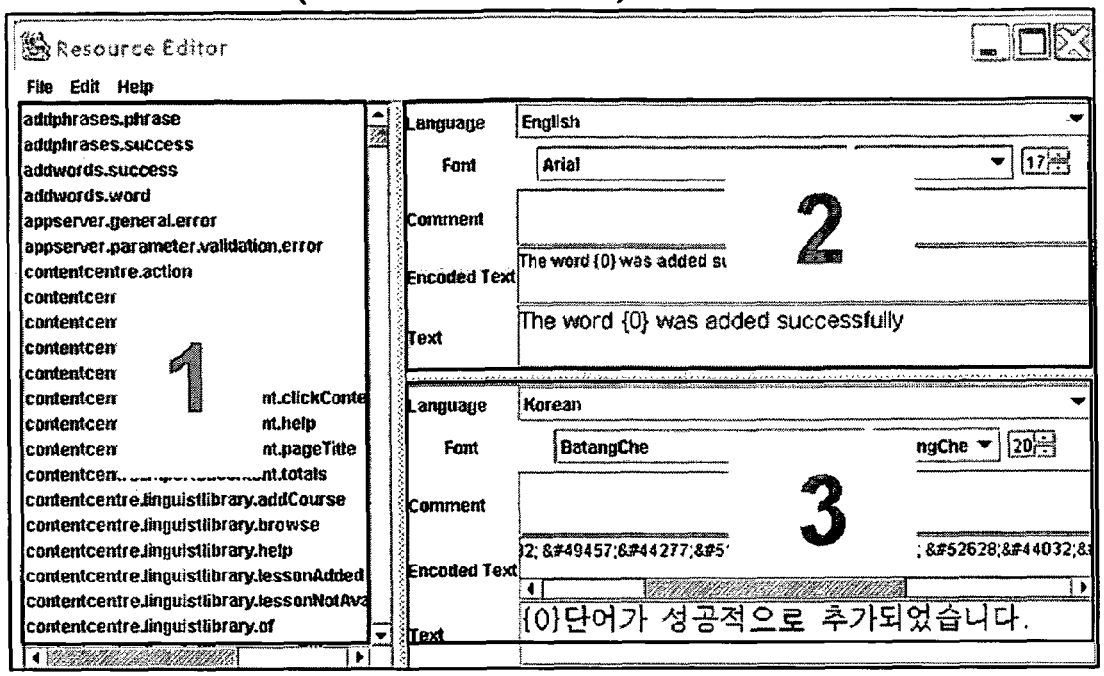
FIG. 1A illustrates, in an image on a computer display, a prior art screen of an editor for a Java ResourceBundle, showing three areas 1, 2, 3.

Note that the screen of FIG. 2B provides contextual information in the form of visual elements on the screen that are visible to the human translator. Hence this screen is used by an editor tool of some embodiments to receive a translation of the text string 215 in act 205 (discussed above). Therefore, a translation of text string 215, which is obtained by use of the screen of FIG. 2B, is more accurate in accordance with the invention, than prior art of the type discussed above in reference to FIG. 1A which does not provide any context whatsoever. Furthermore, the screen of FIG. 2B precisely identifies a source of the text string 215 to be displayed, via resource information in PERI that supports one or more features not possible in the prior art of the type discussed above in reference to FIGS. 1B and 1C. For example, if text string 215 displayed in the screen of FIG. 2B contains a typographical error, then the identification of a specific source from which the text string is displayed enables a quick and accurate correction of the error. In some embodiments, string 215 is kept in a properties file such as a dictionary table. In one specific embodiment, the resource information includes a specific name of a file (e.g. representing a Classname in Java), and a key (which is an index that uniquely identifies the text string within a file of the specific name).

Figure 1B:
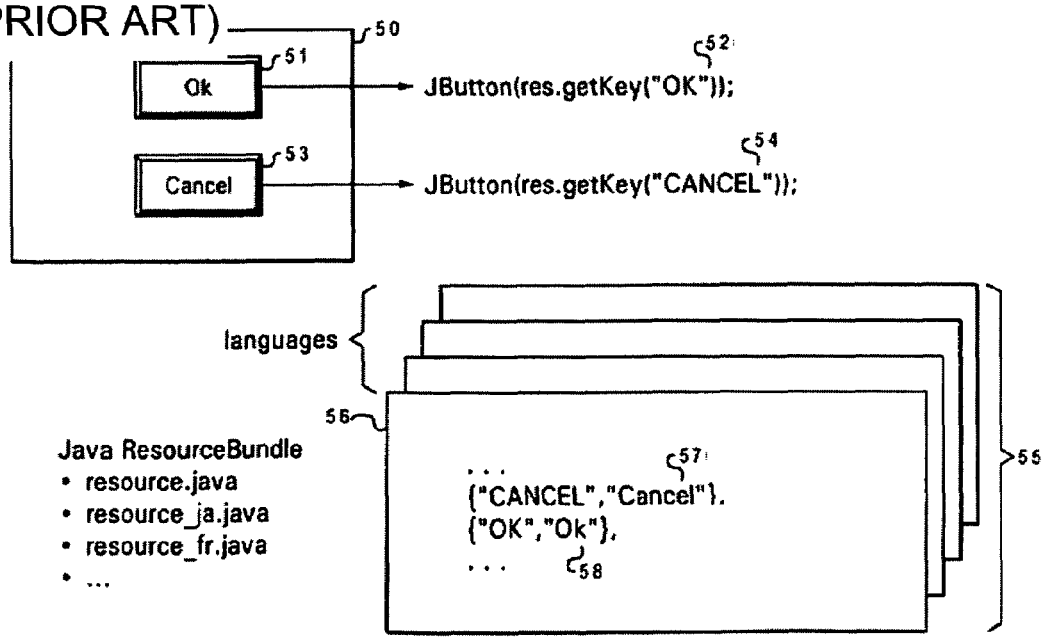
FIG. 1B Illustrates, in a block diagram, a user interface (UI) object that retrieves a text string for display from a Java ResourceBundle by invoking JButton, as shown in the prior art of U.S. Pat. No. 6,311,151.
Figure 1C:
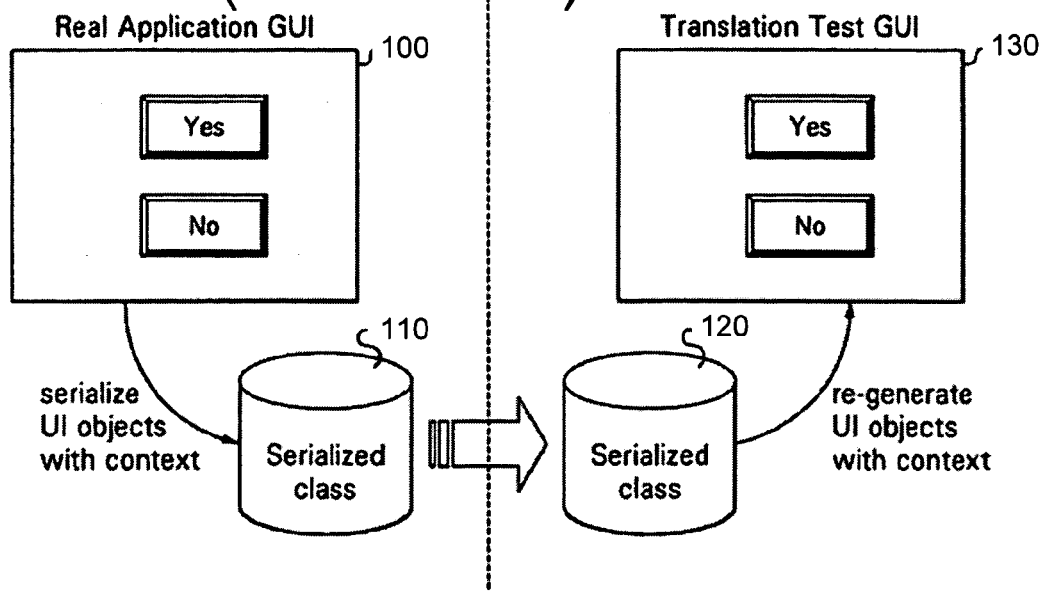
FIG. 1C illustrates, in another block diagram, serialization of UI objects, and re-generation of the UI objects with context, from serialized classes, as shown in the prior art of U.S. Pat. No. 6,311,151.

Some embodiments of a method of the type illustrated in FIG. 2A use HTML in PERI which has another distinction, over the prior art of FIGS. 1B and 1C as follows. Specifically, in some embodiments, PERI which is transferred from a server computer to a client computer is expressed in hyper text markup language HTML as shown in FIG. 2C. Therefore, the PERI of these embodiments contains a number of tags, including a start tag <HTML> and an end tag </HTML> respectively labeled in the web page of FIG. 2C as 217 and 218. Although, a HTML tag is always contained in a HTML Page (e.g. Web Page), as will be apparent to the skilled artisan one or more different tags may be used in other languages, depending on the embodiment. One specific embodiment does generate a HTML Page, and in this embodiment the PERI page contains the two tags <HTML> and </HTML>. Regardless of the language used, in many embodiments, the resource information in PERI is hidden, e.g. inside a comment or alternatively as the value of an attribute of a tag, such as the tag <SPAN> or the tag <DIV>. Note that instead of being hidden within the same web page, in some embodiments the resource information is removed from and transferred to an additional file, e.g. of a predetermined extension (such as '.peri' or '.eri' depending on the number of characters allowed in file extension). In such embodiments, the additional file and the web page are transmitted together, from a server (where they are both created) to a client. Note that the two files (the web page and its additional file) are together equivalent to a PERI page of the type described herein. In embodiments of the type illustrated in FIG. 2C, the PERI contains additional tags of HTML, such as table start tag 219 and table end tag 220, with the table start tag 219 having an attribute 221, which in this example is "width" of value 100%. Such tags are not, to the inventors knowledge, present in prior art serialized classes 110 and 120 shown in FIG. 1C, because these items 110 and 120 are believed to be in binary form.

As shown in FIG. 2A, an act 206 to use resource information 216 of a text string 215 may be performed by an editor tool in accordance with the invention, after any one or more of acts 203, 204 and 205, depending on the embodiment. As an example, in one embodiment illustrated in FIG. 3G and described below, act 206 is performed after each of acts 204 and 205 although this is not necessary in other embodiments. Also, while some embodiments perform act 202, to transmit PERI from a server computer to a client computer as shown in FIG. 3A, other embodiments may create and use PERI within a single computer.

Figure 3A:
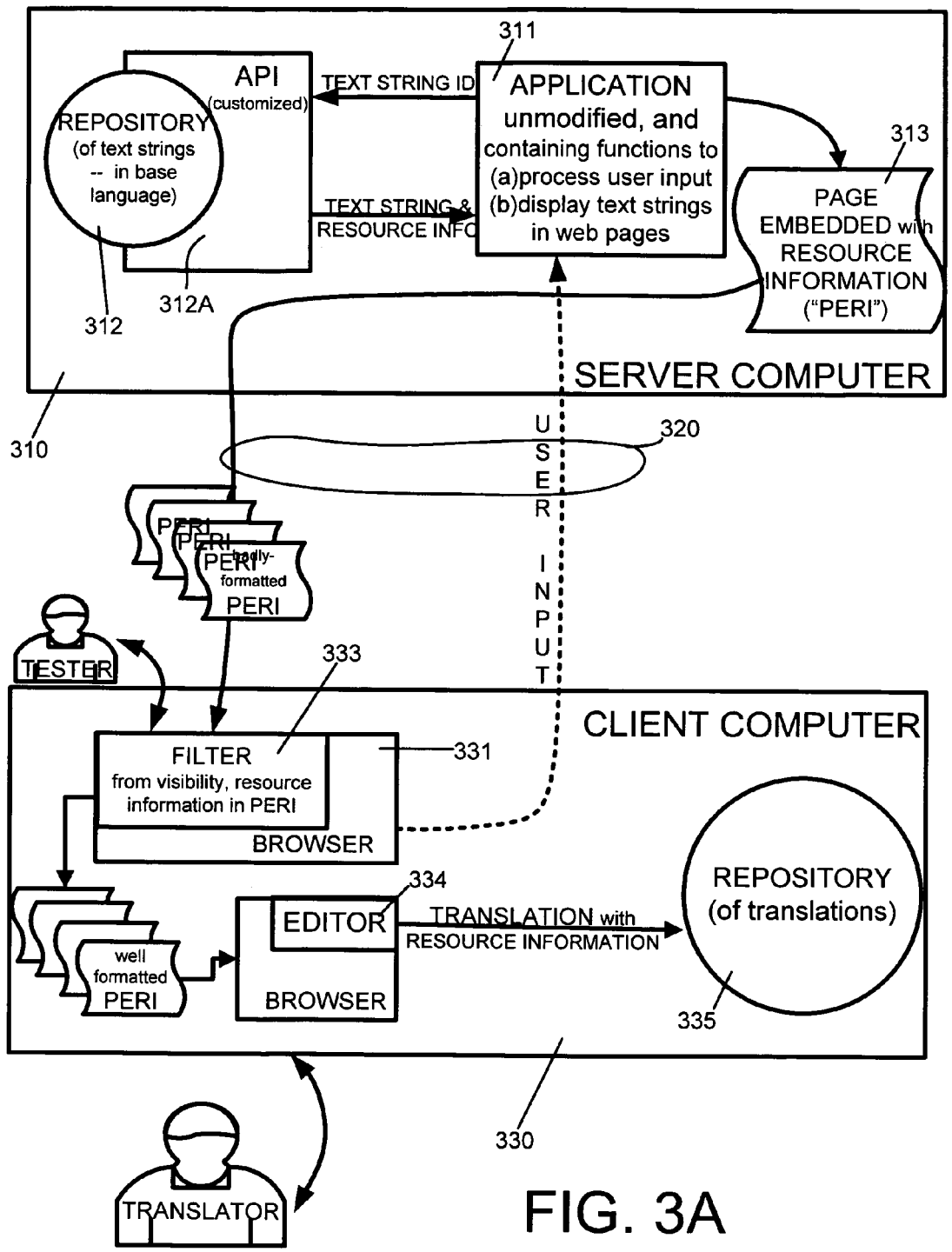
FIG. 3A illustrates, in a block diagram, flow of information between a server computer and a client computer that are used in some embodiments to respectively create and use PERI in accordance with the invention.

In the embodiment illustrated in FIG. 3A, server computer 310 contains an application program 311 that supplies an identifier of a text string, to a repository 312 that contains a number of text strings including the identified text string. Repository 312 responds to the identifier from application 311 by supplying not only the requested text string but also the resource information, which as described above, identifies a repository and a unique string identifier within the repository that together identify the text string to be displayed. In this particular embodiment, application program 311 which is kept unmodified, processes the returned string in the normal manner, by building a web page containing the returned string, which web page is called PERI. Note that during building of the web page, the just-described application program 311 (which is a J2EE web application in one embodiment) creates tags, such as tags 217, 218, 219 and 220 illustrated in FIG. 2C (described above).

Repository 312 illustrated in FIG. 3A contains software in this embodiment, to perform the acts 314-316 illustrated in FIG. 3B to prepare the single returned string, although other embodiments of repository 312 are programmed in different ways that will be apparent to the skilled artisan in view of this disclosure. Specifically, in an act 314, server computer 310 is programmed to identify the text string to be displayed on the web page, from an identifier supplied by a current function in application program 311. Note that in this embodiment, the identification is done in the manner described above in reference to FIGS. 1A-1C, although in other embodiments the identification is done differently. For example, the identifier is used as a key in a Java ResourceBundle, to retrieve it's value which is text string 215.

Next, in act 315 (FIG. 3B), server computer 310 is programmed (e.g. an existing application programming interface (API) 312A in FIG. 3A is customized), to identify the name of an object in which the text string resides. In one specific example, the Java API to a resource bundle is modified e.g. by issuing the instruction this.getClass( ).getName( ) in Java. Note that in this embodiment, a customized ResourceBundle class, containing this instruction, is placed in a Java Application Resource (JAR) file in the server computer 310 (FIG. 3A). Moreover, server computer 310 is further programmed (e.g. as per act 316 which is also performed in the customized ResourceBundle class), to modify the identified text string 215, by concatenating to it (either at the beginning or at the end), one or more components of resource information, such as (a) the name 318B (FIG. 3C) of the current repository 312 as identified in act 315, and (b) the identifier 318A used to find the text string in repository 312. Note that a length (not shown) that is the total length of the text string may also be included in a modified version (i.e. source-descriptive version) of the text string of some embodiments.

After concatenation, the resulting text string is returned by repository 312 to application 311, which in turn uses this returned text string to prepare a web page in its normal manner of operation, as per act 317 (FIG. 3B), resulting in PERI 313, an example of which is shown in detail in FIG. 3D. This web page 313 (FIG. 3D) when displayed results in the resource information being displayed adjacent to the corresponding text string as shown in FIG. 3D1 and for this reason this web page 313 is also referred to as "badly-formatted" PERI.

In one specific embodiment, during concatenation of the resource information to the identified text string, one or more predetermined character sequences, such as [[[[, $$, and ]]]] are added into the string for use in later parsing of the string, to recover individual components from the text string in the PERI. In the example shown in FIG. 3C, the sequence [[[[is added at the very beginning of the resource information, ]]]] is added at the very end of the resource information, while $$ is added between adjacent components of the resource information. Moreover resource information is prepended to the identified text string, within the opening and closing braces i.e. [[[[and ]]]] in this embodiment, although in an alternative embodiment the resource information may be appended to (e.g. follow) the identified text string.

Also, depending on the embodiment, another format may be used, e.g. the identified text string may be placed completely outside of the opening and closing braces, with just the resource information being within these braces. Regardless of the order of resource information relative to a text string and the syntax used, their combination forms a source-descriptive version of the text string. Combination of such resource information with a translatable text string may be made either by physical proximity from being concatenated together, or by any indirect linkage therebetween e.g. by use of a pointer, depending on the embodiment. Combination of the type described above, which results in a source-descriptive version of the text string provides information which is used in several embodiments of the invention to assist a human translator as described elsewhere herein.

As will be apparent to the skilled artisan in view of this disclosure, in other embodiments the order may be different, e.g. the resource information may follow the identified text string. Also, in other embodiments, other character sequences may be used. Specifically, fewer or more number of characters may be used in the predetermined sequences, and the particular characters that are used may be different. Furthermore, the predetermined sequences in other embodiments need not be of the same character, e.g. any arbitrary character sequence that is not in repository 312 may be used, so long as the client computer 330 (e.g. filter 333) is appropriately programmed with that same arbitrary character sequence to parse PERI (i.e. to recognize the individual components thereof. Also, as will be apparent to the skilled artisan, other components of resource information may be included and/or one or more of the above-described three components may be omitted, also depending on the embodiment.

Note that application program 311 may repeatedly obtain a number of strings from repository 312 all of which are used in building a single PERI 313 (e.g. if the web page contains a number of text strings, which is typical in most examples). Note also that in the embodiment shown in FIG. 3A, application program 311 is kept unmodified, and hence PERI 313 (FIG. 3D) that has been generated thereby, when displayed in a browser, visually displays all embedded resource information. Visual display of embedded resource information results in a distorted screen (see FIG. 3D1), because the resource information 216 (FIG. 3C) is displayed in addition to and adjacent to normally-displayed text string 215. Note that in the embodiment illustrated in FIG. 3D1, the resource information is prepended to the identified text string, and they are together enclosed between sequences [[[[and ]]]], and they are separated from each other by the sequence $$$$. In this embodiment, which is also illustrated by string 332 in FIG. 3G, the sequence $$ separates a string identifier from its class name.

In accordance with the invention, a distortion resulting from displaying the resource information within the web page itself (as shown in FIG. 3D1) is eliminated in some embodiments, by filtering of badly-formatted PERI 313 (FIG. 3D) by a computer program 333 that is invoked in a browser 331 (e.g. in the form of a plugin thereto), to remove from visibility, the resource information, so as to form a well-formatted web page. The web page is considered well-formatted if, when loaded in a browser, it generates the same image as the original web page (i.e. image lacks the resource information in the display).

Although the resource information may be filtered from visibility in many different ways (e.g. by stripping it off and storing in a separate file), in some embodiments the resource information is kept hidden within PERI itself, e.g. by placing resource information 216 inside a comment or in a value of an attribute of a tag. The resulting PERI is also referred to as well-formatted page embedded with resource information (or well-formatted PERI). Therefore, a well-formatted PERI is easily generated by hiding the resource information in the above-described PERI 313 (also referred to as badly-formatted PERI).

Note that hiding may be performed in any of a number of methods that will be apparent to the skilled artisan in view of this disclosure. Hiding of embedded resource information in a comment is shown in FIG. 3E, wherein a tag portion <!-- which is labeled as 341 is inserted before resource information 216 and another tag portion --> which is labeled as 342 is inserted after resource information 216. Hence, when such a well-formatted PERI (FIG. 3E) is displayed by browser 331, the screen shown in FIG. 2B is generated.

Figure 3F:
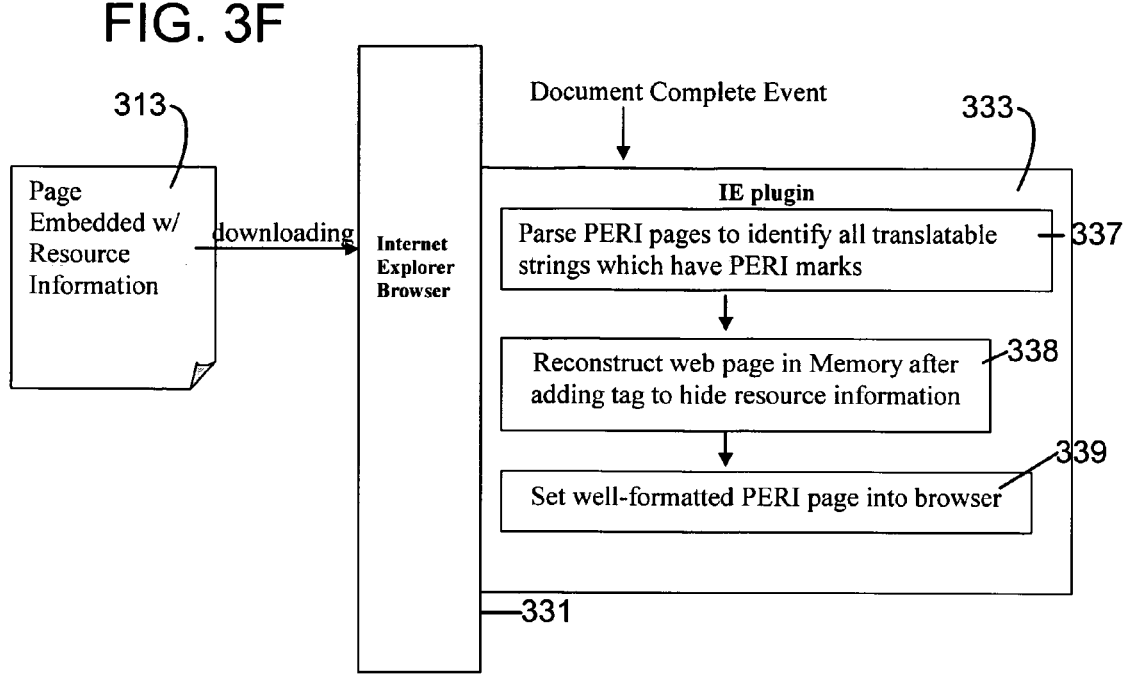
FIG. 3F illustrates an editor tool that displays a frame 391 containing a screen obtained by displaying PERI, and additional frames 392 and 393 prepared from resource information embedded in PERI.

An illustrative filter 333 (FIG. 3A) that is implemented as a plug-in for the browser Internet Explorer (version 5.50, available from Microsoft Corporation) is discussed next, as an example implementation, and it is to be understood that other implementations will become apparent to the skilled artisan in view of this disclosure. Specifically, in this implementation, the Internet Explorer ("IE") browser 331 (FIG. 3F) is configured to receive badly-formatted PERI 313 (i.e. the badly-formatted page embedded with resource information) from a server. When the IE browser 331 finishes downloading badly-formatted PERI 313, a Document Complete event is sent by IE Browser 331.

Figure 3G:
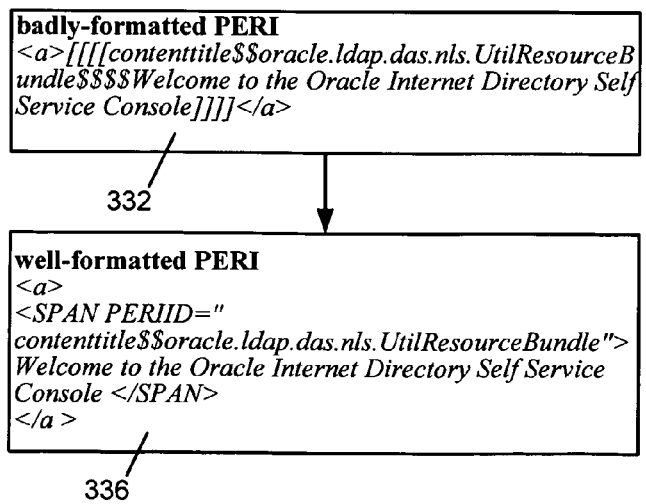
FIG. 3G illustrates, in a flow chart, acts performed to use the resource information 216 by an editor tool in some embodiments of the invention.

Once the plug-in 333 captures the event, plug-in 333 reconstructs the received web page into a well-formatted web page by placing its resource information in the value of an attribute of the tag <SPAN>, as shown in FIG. 3G. Note that a predetermined attribute called "PERIID" in FIG. 3G is a customized attribute for <SPAN>, defined in this implementation specifically for holding the resource information. Presence of this attribute PERIID signals to appropriately programmed software that what follows is resource information. As will be apparent to the skilled artisan, such a custom attribute can have any arbitrary name, depending on the embodiment. Moreover, as will be apparent to the skilled artisan, any arbitrary attribute of any other tag (e.g. tag <DIV>) may be used to hide resource information, i.e. to form a well-formatted page embedded with resource information (i.e. well-formatted PERI).

The specific acts 337-339 (FIG. 3F) performed by plug-in 333 are now discussed as an exemplary illustration. In act 337, the badly-formatted PERI 313 which has just been received from the server is parsed, to identify the precise beginning and ending of the resource information as follows. Two predetermined character sequences [[[[and ]]]] are searched for and found within badly-formatted PERI 313, for each resource information. Next, an embodiment that generates the PERI shown in FIG. 3D performs act 338, wherein a tag portion 341 (FIG. 3E) is placed just before each sequence [[[[, and tag portion 342 is placed just after each sequence ]]]]. When such converting is completed, plug-in 333 stores the well-formatted PERI locally, for use by an editor 334 that may be implemented within another instance of the browser (see FIG. 3A). Therefore, while a tester that operates the filter 333 sees a display of the badly-formatted PERI, the translator sees a display of the well-formatted PERI. As shown in FIG. 2B, the well-formatted PERI has the same image as the application 311's original image (obtained with the original unmodified ResourceBundle).

In the embodiment described in the previous paragraph, a tester may interact with the application program 311 any number of times, to generate a number of well-formatted PERI pages that are to be translated by the translator. While in FIG. 3A, the tester and the translator are shown working in the same client computer 330, in alternative embodiments, each of them has their own dedicated computer, and the well-formatted PERI pages are transferred from the tester's computer to the translator's computer in any manner, e.g. by use of a storage medium (such as a floppy disk or a flash memory), or by use of a transmission medium (such as by sending the well-formatted PERI pages in an email). Note that instead of tag portions 341 and 342 which form a comment tag, other character sequences may be placed e.g. to form tag <SPAN> as illustrated in FIG. 3G. Note that in the badly-formatted PERI illustrated in FIG. 3G, the resource information does not contain the above-described "length" component, and note further that in this embodiment the sequence ]]]] is placed not immediately after the resource information but instead it is placed immediately after the identified text string 215 which is to be displayed.

At this stage, a human tester may use the displayed screen (FIG. 2B) to provide appropriate input such as text input from a keyboard and/or graphical input from mouse operation, to interact with application 311 in the normal manner. The experience of the human tester in interacting with application 311 is identical to a corresponding experience if the repository 312 were to have been kept unmodified (i.e. if PERI 313 were to not contain any resource information). In this manner, the human tester may have a complete context for a text string 215 displayed in the screen of FIG. 2B.

As will be apparent to the skilled artisan in view of this disclosure, an application 311 that is unchanged, is used in two different ways in accordance with the invention: (1) as a production platform (by real applications), and (2) by the human tester for generating pages to be translated. Therefore, in the example shown in FIG. 2B, a human tester may review profile, change password and lookup people etc, during such interaction with application 311 which in this example is a directory of employees in the company ORACLE Corporation. Hence, the human tester-interacts with the real application, which does not require a GUI to be formed from binary objects transported as serialized classes, as done by the prior art illustrated in FIG. 1C. At this stage, if the human tester so chooses, they may inform a human translator to invoke an editor tool 334 to receive a translation, e.g. for text string 215 in FIG. 2B. In the embodiment illustrated in FIG. 3A, the received translation is stored by editor tool 334 in a repository 335. Note that in FIG. 3A, the translation repository 335 is shown located in client computer 330, although as will be apparent to the skilled artisan, repository 335 may be kept in the server computer or even in another computer altogether.

While editor tool 334 may be programmed to perform any steps apparent to the skilled artisan in view of the above disclosure, to use resource information in assisting the human translator to provide translations, some embodiments of editor tool 334 perform the acts illustrated in FIG. 3H to generate the display illustrated in FIG. 3I which are discussed next. In an act 341, an editor tool 334 of some embodiments identifies all text strings that are to be translated in a given web page, e.g. by looking for <SPAN> tag with attribute PERIID, and then generates a list of these strings which can be selected by a human translator (as per act 342 in FIG. 3H), for example by scrolling up and down in a window 353 (FIG. 3I).

In some embodiments, once the human translator makes a selection of a text string to be translated, editor tool 334 automatically highlights all occurrences of this text string in the entire web page, by changing an attribute thereof (e.g. by changing the string's color or making the string bold or by blinking the string's background). In the example illustrated in FIG. 3I, if the human translator were to select the string "Login" as being the string to be translated, then the three occurrences 357-359 are all highlighted by editor tool 334.

Figure 3H:
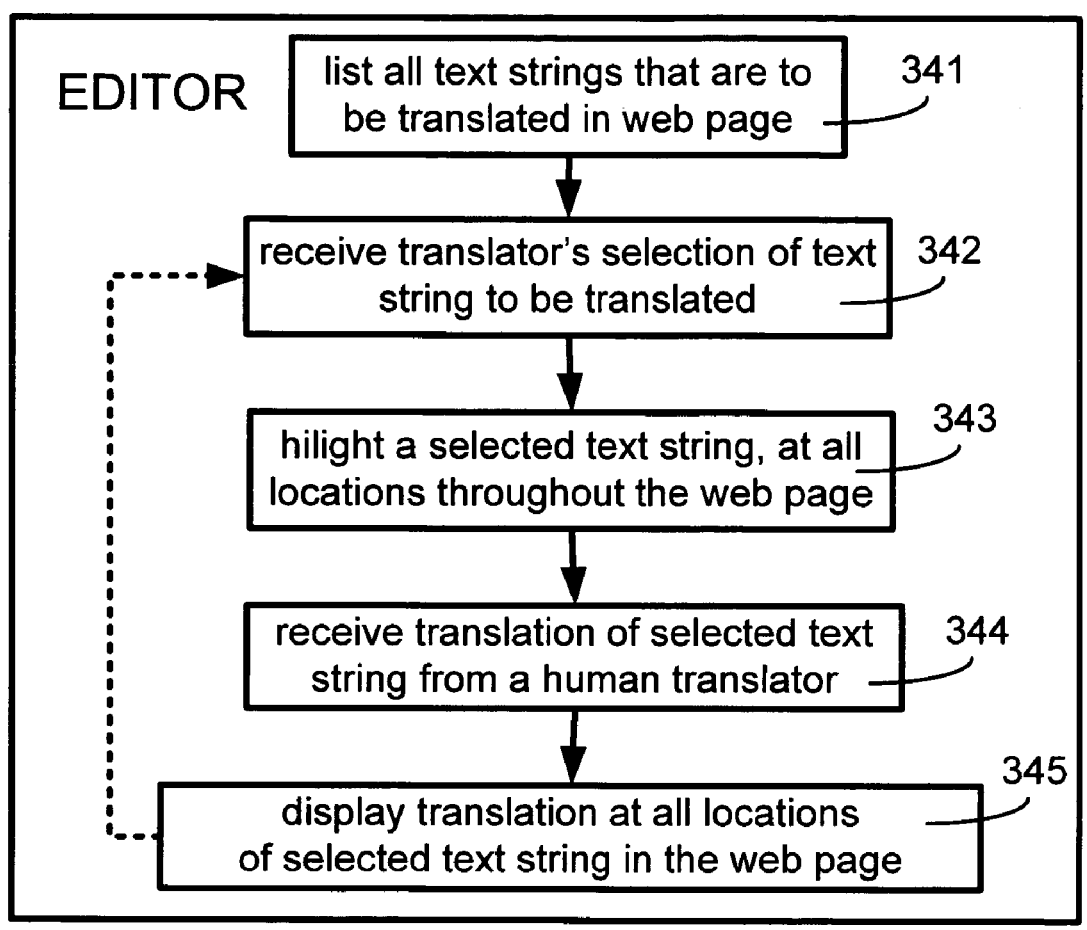
FIG. 3H illustrates, in an image on a computer display, a screen generated in some embodiments, by an editor tool of the type shown in FIG. 3G.
Figure 3I:
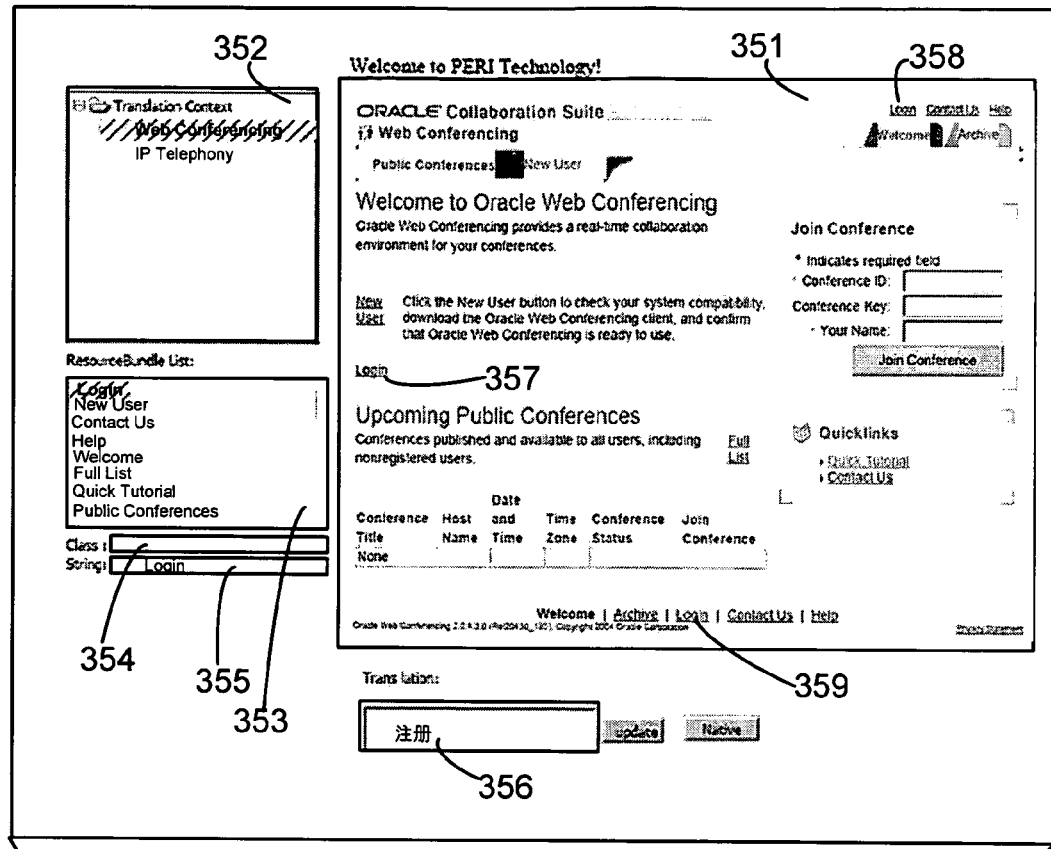

In the embodiments illustrated in FIG. 3I, editor tool 334 also displays, in a window 352, a number of web pages that are available for translation by the human translator. In the example illustrated in FIG. 3I, only 2 well-formatted pages are available to the translator, namely "Web Conferencing" and "IP Telephony." Once the translator selects one of these pages (e.g. "Web Conferencing" is shown selected in FIG. 3I), then every translatable string in this page is identified and displayed in window 353. The human translator may then select one of these text strings in window 353 (e.g. the string "Login" is shown selected in FIG. 3I), and on doing so it is identified by Class name in window 354 and String Key in Java in window 355 (which in this embodiment happens to be in the base language, e.g. English). Note that in this embodiment, the PERI pages are located in a directory "Translation Context" which is also shown in window 352. The human translator may nagivate a directory structure in window 352, in the normal manner, to find a PERI page that the translator wishes to translate next.

Figure 3J:
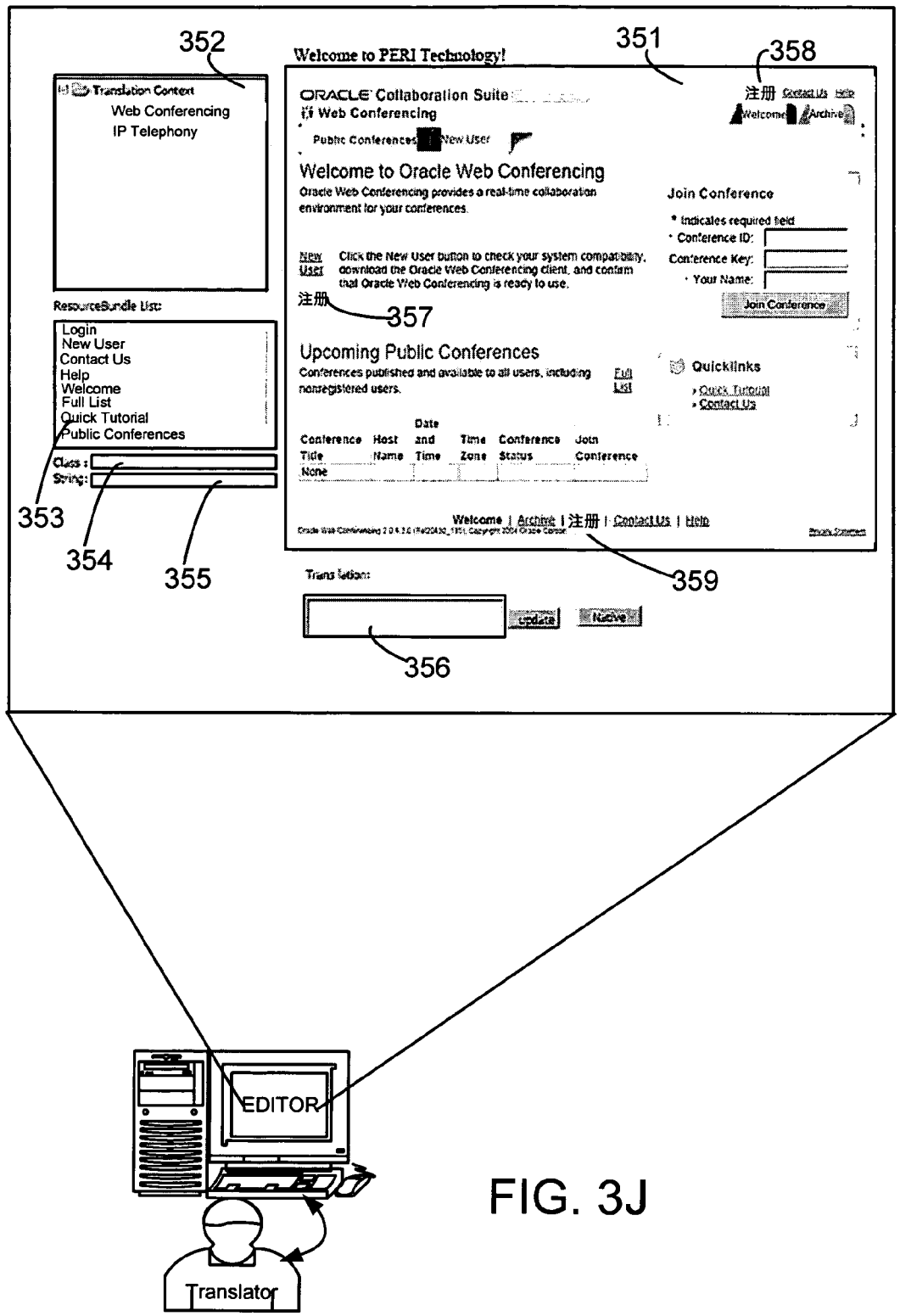

Editor tool 334 receives the translation from the human translator, in a window 356 (FIG. 3I), as per act 344 (FIG. 3H). On receipt of translation (e.g. after the human translator clicks the "update" button which is located to the right of window 356, subsequent to typing in the translation in window 356), the editor tool 334 replaces all occurrences 357-359 of selected string 355, with the corresponding translation in the displayed web page, as per act 345 (FIG. 3H). In the example illustrated in FIG. 3I, the translator has typed in "注册" in Chinese language (simplified) as the translation of the string "Login", and the resulting screen, with all occurrences replaced, is shown in FIG. 3J.

Note that in one embodiment, this single translation, after being saved to the repository 335 (FIG. 3A) is automatically used in any web page that contains the same string, which eliminates the need for the translator to redundantly translate the same string multiple times. In such an embodiment, when a PERI page is first selected by a human translator, that page is automatically scanned by editor tool 334 for any text strings that have entries in translation repository 335 and if so these translations are substituted instead of the text strings in the window 351. Note that window 351 (FIGS. 3I and 3J) displays the web page being translated, as rendered by a browser. Moreover, editor tool 334 returns to act 342 (FIG. 3H) to receive additional translations from the human translator. At any time, e.g. after all strings in the currently-displayed web page have been translated, the human translator may choose to stop translating and close the web page, and load another web page.

In some embodiments, a customized ResourceBundle class is placed in server computer 330 in a predetermined path in a user's account (in which application 311 is executed) that is known to be searched prior to the path in which an unmodified ResourceBundle class is present for the application 311. Therefore, there is no need to make application 311 aware of any change in its ResourceBundle class. In alternative embodiments that use a dedicated server computer for interfacing to human translators, the unmodified ResourceBundle class for application 311 is overwritten by a customized ResourceBundle class. Also, in some embodiments, an editor tool 334 maintains a glossary of terms that have been previously translated by the human translator, and displays one or more candidate translations (see FIG. 3K) for the strings to be translated.

Figure 4A:
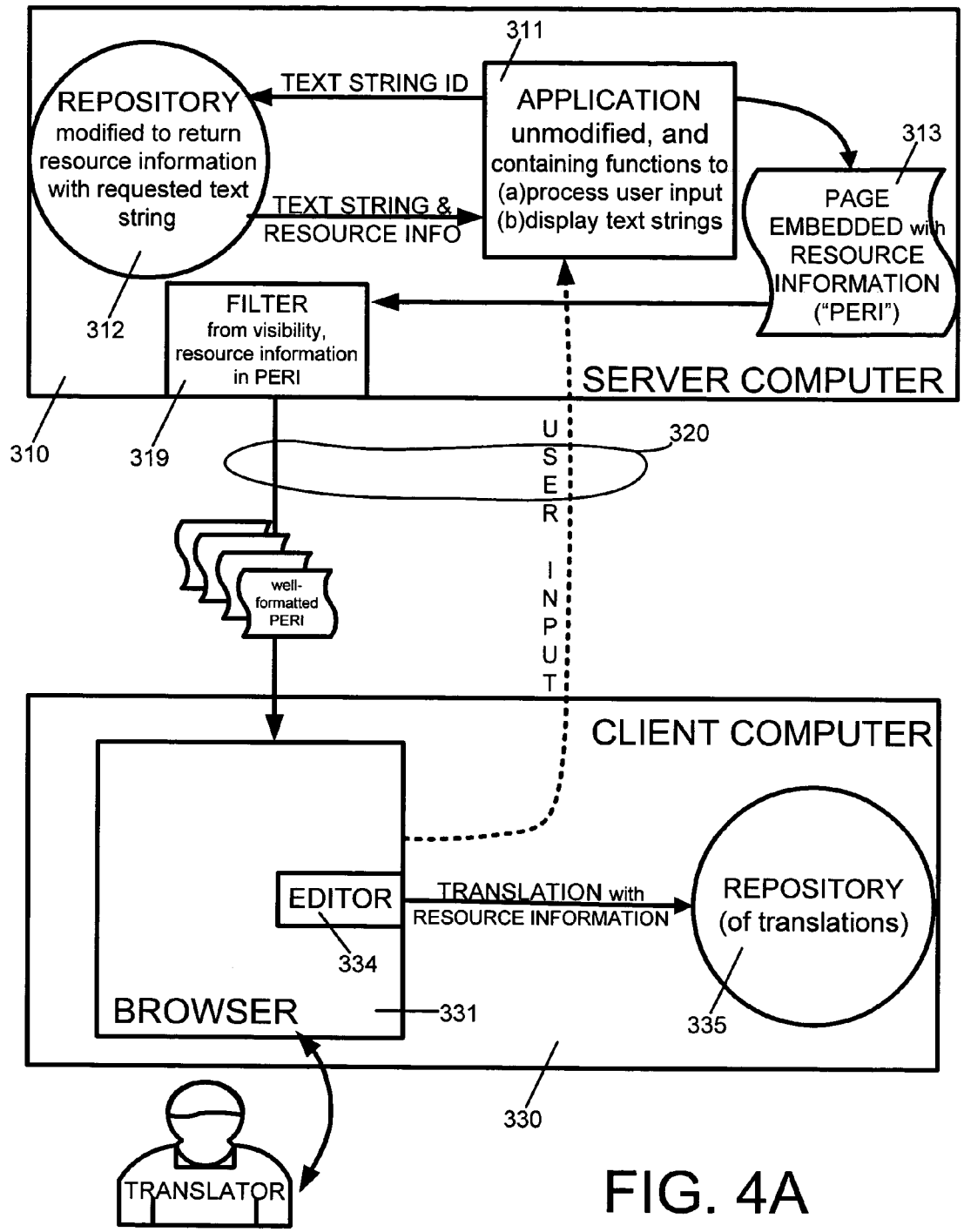
FIGS. 4A-4C illustrate, in a block diagram similar to FIG. 3A, three alternative embodiments of the invention.

In an alternative embodiment illustrated in FIG. 4A, a filter 319 of the type described above is present inside of the server computer. In the embodiment shown in FIG. 4A, the badly-formatted PERI pages from application 311 are converted into well formatted PERI pages within the server computer itself, and these well formatted pages (which contains resource information embedded in a tag such as a comment tag or a <SPAN> tag or a <DIV> tag, as noted above) are transferred by the server computer to the client computer. On receipt of a well-formatted PERI, it is directly rendered on to the display by a browser in the client computer.

Figure 4B:
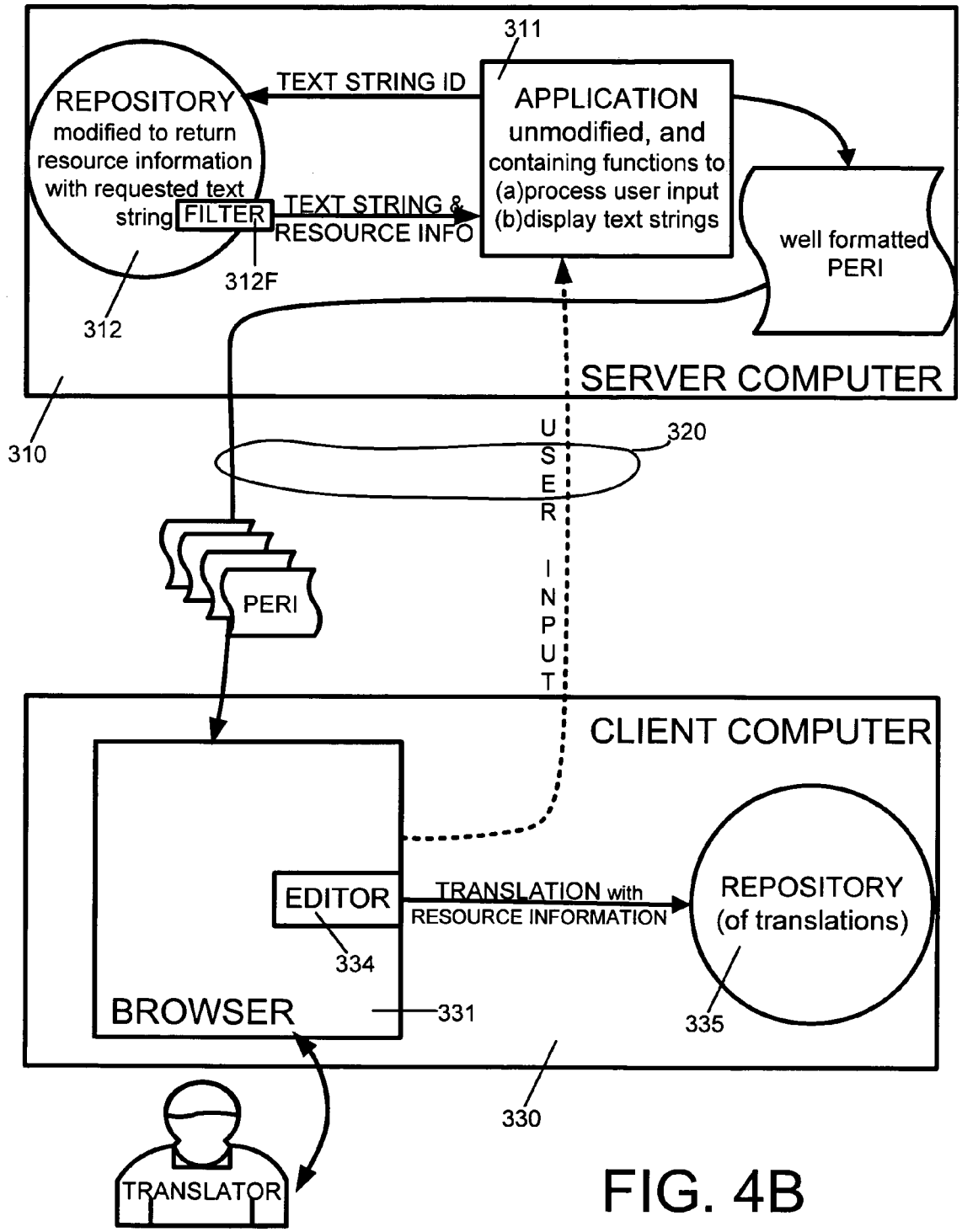

Note that the above-described embodiments are suitable for implementation in server computers that use either of the two operating systems: Windows and Unix. In another alternative embodiment that uses a server computer running the operating system Windows, as illustrated in FIG. 4B, a filter 312F of the type described above is present inside of the customized ResourceBundle itself. In this embodiment a badly-formatted PERI page is never generated by application 311, because the text string returned by filter 312F already contains the resource information embedded in a tag (such as a comment tag).

Figure 4C:
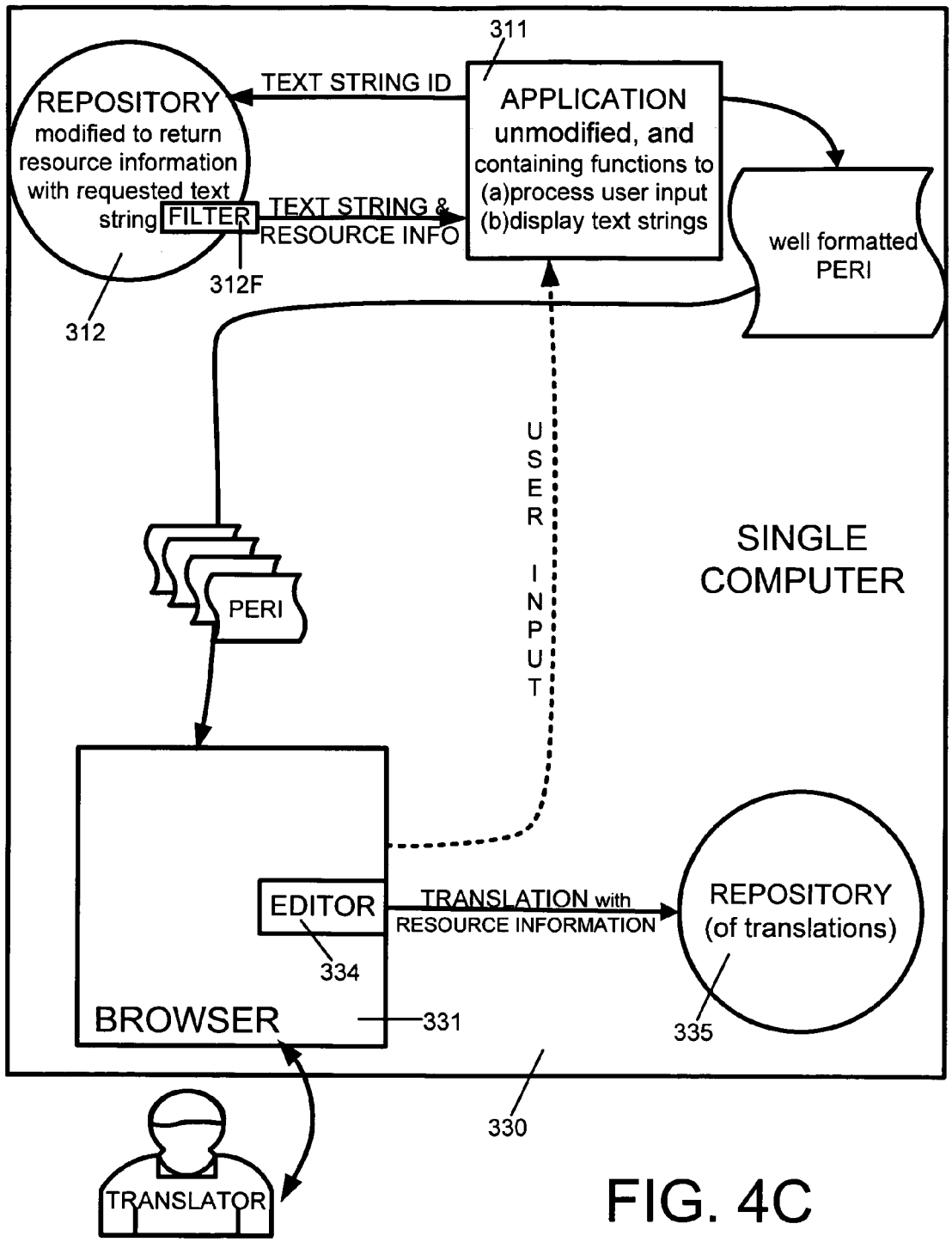

Furthermore, although some embodiments use a server and client architecture, in other embodiments a single computer may execute all of the software, as illustrated in FIG. 4C.

The present invention need not be limited to Java, and also need not be limited to object-oriented programming languages. Instead, several embodiments are implemented in any of a number of different programming languages as will be apparent to the skilled artisan in view of this disclosure. For example some embodiments are implemented using web pages in the language DHTML, and use a function "getstring (StringID1)" in the DHTML interface in the Oracle Collaboration Suite. This function "getstring" is customized to (instead of returning the string) return the file name and the string id in addition to the string itself. Such embodiments may change the software source code which generates the DHTML page—after installation of an instance of the application. Therefore, in such embodiments, Javascript loads the modified getstring function and an output of this DHTML interface results in a badly-formatted PERI of the type described above.

Many embodiments of the invention use a computer system 500 of the type illustrated in FIGS. 5A and 5B which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions (e.g. of the method in FIG. 2A or FIG. 3A) to be executed by processor 505. Memory 506 also holds one or more temporary TDSs (e.g. TDSs 323-326 in FIGS. 3C-3F) generated during execution of such instructions.

Main memory 506 also may be used for storing temporary variables or other intermediate information (e.g. type cells of FIG. 4A, pointer structures of FIG. 4B, and context data of FIG. 4C) during execution of instructions (FIG. 2A or FIG. 3A) by processor 505. Computer system 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, automated database patching is provided by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 505 for execution. Such a storage medium may take many forms, including but not limited to, non-volatile media, and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of computer readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, as described hereinafter, or any other storage medium from which a computer can read.

Various forms of computer readable storage media may be involved in carrying one or more sequences of one or more instructions to processor 505 for execution. For example, the instructions may initially be carried on a magnetic disk (which is one example of a computer readable storage medium) of a remote computer. The remote computer can load the instructions into its dynamic memory (which is another example of a computer readable storage medium) and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 (which is also a computer readable storage medium) either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 528 now commonly referred to as the "Internet". Local network 522 and network 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a description of a top-level abstract data type (describing additional abstract data types embedded therein) through Internet 528, ISP 526, local network 522 and communication interface 515. In accordance with the invention, one such description in the form of TDS 203 (FIG. 2B) has reduced memory size due to use of multiple offsets (at least one internal and one external) that identify a common location of an embedded TDS, as described herein. Such a top-level description may be used by processor 505 as it is received, and/or stored in storage device 510, or other non-volatile storage for later execution. In this manner, computer system 500 may also obtain the top-level description in the form of a carrier wave (e.g. from another computer over a network).

Figure 5A:
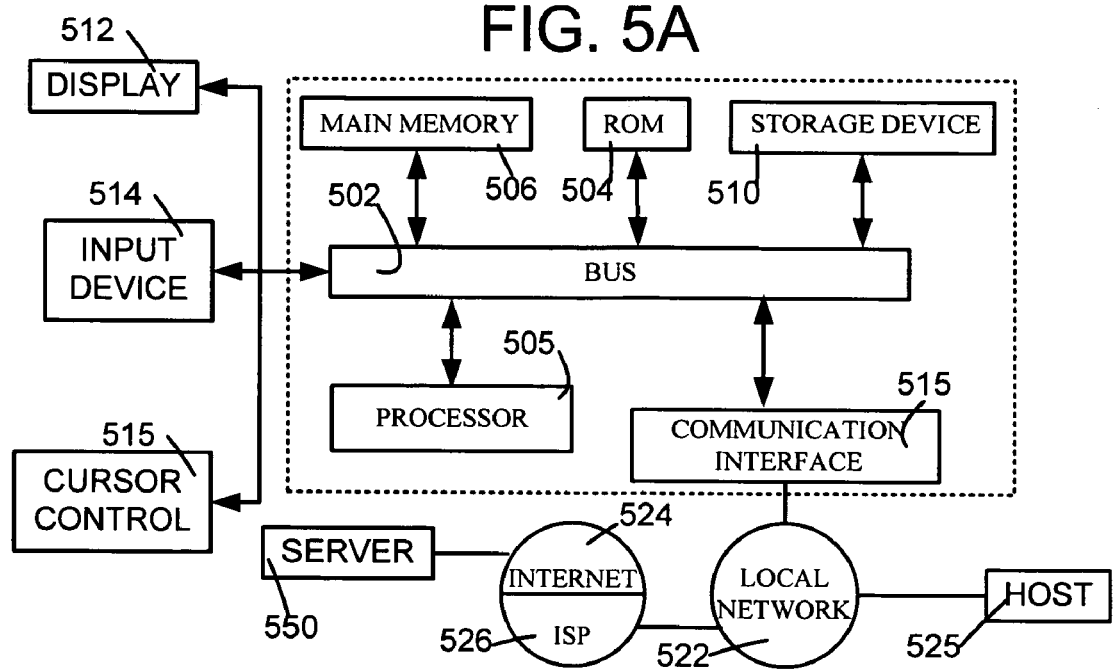
FIGS. 5A and 5B illustrate, in block diagrams, portions of a computer that is programmed to perform the method of FIG. 2A in some embodiments of the invention.
Figure 5B:
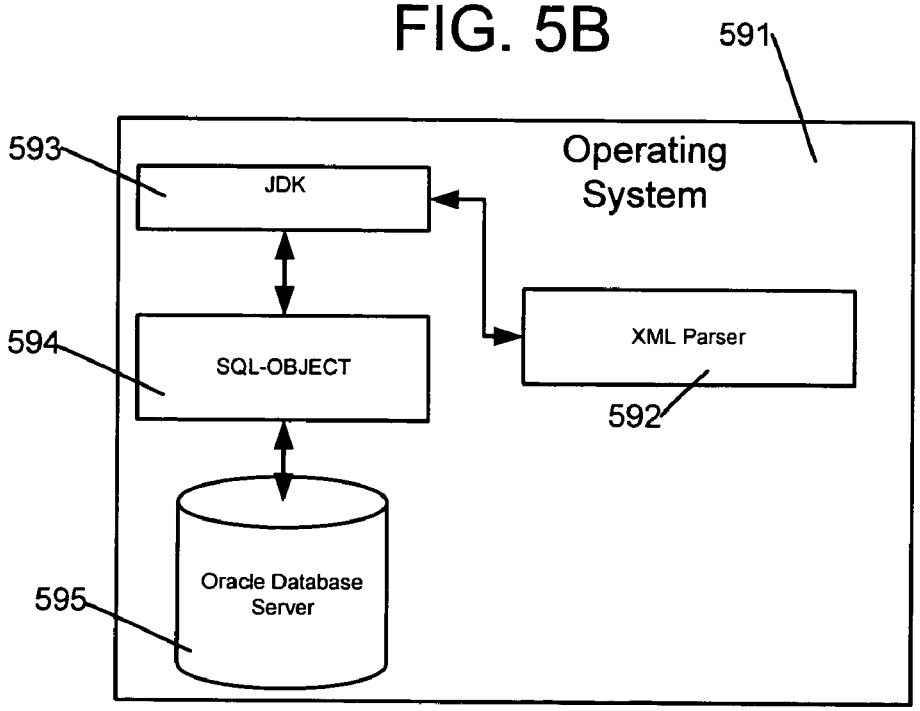

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Numerous modifications and adaptations of the embodiments described herein will become apparent to the skilled artisan in view of this disclosure. For example, although in some embodiments, two separate items namely the name of a function, and the identifier of a translatable text string are included in a PERI page of the type described above (regardless of whether well-formatted or badly-formatted), in other embodiments a single item may be used to encapsulate information that uniquely identifies the text string across all functions (e.g. a globally-unique String ID may be used).

Numerous modifications and adaptations of the embodiments described herein are encompassed by the scope of the invention.

Following this paragraph is pseudo-code which forms an integral part of this detailed description. The pseudo-code provides further detailed description of implementation of an illustrative embodiment of the type shown in FIG. 2A.

PSEUDO CODE

Following is a detailed step-by-step description, in pseudo-code format, illustrating the PERI methodology.

```
Modified ResourceBundle.java
package java.util;
abstract public class ResourceBundle {
    public final String getString(String key) {
        return (String) getObject(key);
    }
    public final Object getObject(String key) {
        Object obj = handleGetObject(key);
        if (obj == null) {
            if (parent != null) {
                obj = parent.getObject(key);
            }
            if (obj == null)
                throw new
MissingResourceException("Can't find resource for bundle
+this.getClass().getName()+", key "+key,
this.getClass().getName(),key);
        }
        //Added by PERI
        if (obj instanceof String){
        String clsname=this.getClass().getName();
        obj=periHandle (obj, clsname, key);
        }
        //End of PERI
        return obj;
    }
    public Object periHandle(Object obj,String clsname, String key) {
        ...
        result="[[[["+key+"$$"+clsname+"$$$$"+obj+"]]]]";
        return result;
        ...
    }
    ...
}
```

What is claimed is:

1. A method performed in at least one computer, to generate a web page when executing an application program, the method comprising:

automatically identifying a text string to be included in the web page, from an identifier supplied by a function that needs to display the text string during execution of the application program;

automatically preparing a source-descriptive version of the text string in accordance with a predetermined syntax, the source-descriptive version comprising each item in a group consisting of (the text string, and the identifier of the text string); and automatically preparing the web page to comprise the source-descriptive version.

2. The method of claim 1 wherein:

the predetermined syntax requires at least a first plurality of predetermined characters at a beginning of, and at least a second plurality of predetermined characters at an end of, the source-descriptive version of the text string.

3. The method of claim 2 wherein:
the predetermined syntax requires at least a third plurality of predetermined characters between any two items in the group; and
the predetermined syntax further requires at least a fourth plurality of predetermined characters between the remaining item in the group and one of the two items in the group.

4. The method of claim 1 wherein:
the identifier is a key in a predetermined class in said repository; and
the text string is a value, in the predetermined class, corresponding to the key.

5. The method of claim 1 wherein:
the web page conforms to a mark-up language; and
the predetermined syntax requires an opening tag at a beginning of, and a closing tag at an end of, the source-descriptive version.

6. The method of claim 5 wherein:
the opening tag is <SPAN>; and
the closing tag is </SPAN>.

7. The method of claim 5 wherein:
the text string, and the identifier of the text string are both identified in a single attribute of the opening tag.

8. The method of claim 5 wherein:
a name of the function is identified in a first attribute of the opening tag; and
the identifier of the text string is identified in a second attribute of the opening tag.

9. The method of claim 1 wherein:
the function is included in an object and the name of the function comprises the name of the object.

10. A computer readable storage medium comprising instructions to be executed by a computer, the computer readable storage medium further comprising a web page resulting from performing a method, the method comprising:
automatically identifying a text string to be included in the web page, from an identifier that specifically uniquely the text string in a repository of text strings in the computer, the identifier being supplied by a function that needs to display the text string;
automatically preparing a source-descriptive version of the text string in accordance with a predetermined syntax, the source-descriptive version comprising each item in a group consisting of (the text string and the identifier of the text string); and
automatically preparing the web page to comprise the source-descriptive version.

11. The computer readable storage medium of claim 10 wherein the webpage comprises:
a plurality of tags in conformance with HTML.

12. The computer readable storage medium of claim 10 further comprising:
a translation of the text string.

13. A computer programmed to create web pages, the computer comprising:
means for identifying a text string to be included in a web page, from a unique identifier that uniquely identifies the text string from among multiple text strings in a repository in the computer, the unique identifier being supplied by a function that needs to display the text string;
means for identifying a name of the function;
means for preparing a source-descriptive version of the text string in accordance with a predetermined syntax, the source-descriptive version comprising each item in a group consisting of (the text string, the name of the function, and the unique identifier of the text string); and
means for preparing the web page to comprise the source-descriptive version instead of the text string.

14. The computer of claim 13 wherein:
the predetermined syntax requires <SPAN> at a beginning of, and </SPAN> at an end of, the source-descriptive version of the text string.

15. A method performed in at least one computer, to convert a first web page into a second web page, the method comprising:
receiving the first web page, wherein the first web page comprises a source-descriptive version of a text string, the source-descriptive version being expressed in accordance with a predetermined syntax, the source-descriptive version comprising each item in a group consisting of (the text string, a name of a source of the text string, and a unique identifier of the text string);
wherein the unique identifier uniquely identifies the text string, from among a plurality of text strings in said source;
automatically parsing the first web page to identify at least one item in the group; and
automatically preparing the second web page, by adding to the first web page at least one of (a tag and an attribute), to hide from display in a browser the name of the source and the unique identifier of the text string;
wherein the second web page comprises said text string, said name of the source, and said unique identifier of the text string.

16. The method of claim 15 wherein:
the source of the text string is a file; and
within at least one of said first web page and said second web page, the name of the file is concatenated to the text string by use of at least one predetermined character.

17. The method of claim 15 wherein:
the source of the text string is a file; and
the unique identifier of the text string in each of first web page and the second web page is a key in a predetermined class in said file.

18. The method of claim 15 wherein:
display of the first web page results in distortion due to presence of said name of the source and said unique identifier of the text string; and
display of the second web page is without said distortion due to hiding of said name of the source and said unique identifier of the text string.

19. The method of claim 15 further comprising:
preparing a third web page comprising a translated text string resulting from translation of the text string.

20. The method of claim 19 wherein:
the second web page is prepared prior to translation of the text string.

21. A computer readable storage medium comprising instructions to be executed by a computer, the computer readable storage medium further comprising the second web page resulting from performing the method of claim 15.

22. A method performed in at least one computer, to convert a first web page into a second web page, the method comprising:
receiving the first web page, wherein the first web page comprises a source-descriptive version of a text string in accordance with a predetermined syntax, the source-descriptive version comprising each item in a group consisting of (the text string, a name of a source of the text string, and an identifier of the text string);
automatically parsing the first web page to identify at least one item in the group; and subsequent to said parsing:

automatically preparing the second web page, by removing from the first web page each of (the name of a source of the text string, and the identifier of the text string); and automatically preparing at least one file comprising at least one of (the name of a source of the text string, and the identifier of the text string).

23. The method of claim 22 wherein:

the source of the text string is a second file; and within said first web page, the name of said second file is concatenated to the text string by use of at least one predetermined character.

24. The method of claim 22 wherein:

the source of the text string is a second file; and the identifier of the text string in the first web page is a key in a predetermined class in said second file; and the text string is a value, in the predetermined class, corresponding to the key.

25. The method of claim 22 wherein:

display of the first web page results in distortion due to presence of said name of the source and said identifier of the text string; and display of the second web page is without said distortion due to absence of said name of the source and said identifier of the text string.

26. The method of claim 22 further comprising:

preparing a third web page comprising a translated text string resulting from translation of the text string.

27. The method of claim 26 wherein: the second web page is prepared prior to translation of the text string.

\* \* \* \* \*

UNITED STATES PATENT AND TRADEMARK OFFICE
CERTIFICATE OF CORRECTION

| | | |
|---|---|---|
| PATENT NO. | : 7,536,640 B2 | Page 1 of 1 |
| APPLICATION NO. | : 11/045924 | |
| DATED | : May 19, 2009 | |
| INVENTOR(S) | : Zhang et al. | |

It is certified that error appears in the above-identified patent and that said Letters Patent is hereby corrected as shown below:

Title page, Item (75) "Inventors", line 2, delete "BeiJing" and insert -- Beijing --, therefor.

In column 4, line 26, delete "invention," and insert -- invention. --, therefor.

In column 7, line 33, after "thereof." insert -- ) --.

In column 9, line 44, delete "tester-interacts" and insert -- tester interacts --, therefor.

In column 9, line 61, delete "FIG. 31" and insert -- FIG. 3I --, therefor.

In column 9, line 67, delete "(FIG. 31)." and insert -- (FIG. 3I). --, therefor.

In column 10, line 7, delete "FIG. 31," and insert -- FIG. 3I, --, therefor.

In column 10, line 26, delete "nagivate" and insert -- navigate --, therefor.

In column 13, line 55, delete "xmiparser" and insert -- xmlparser --, therefor.

In column 15, line 50, in claim 11, delete "webpage" and insert -- web page --, therefor.

Signed and Sealed this

First Day of June, 2010

David J. Kappos
*Director of the United States Patent and Trademark Office*